(12) United States Patent
Kinnen et al.

(10) Patent No.: US 6,500,400 B1
(45) Date of Patent: Dec. 31, 2002

(54) PROCESS FOR PREPARING PRECIPITATED CALCIUM CARBONATES

(75) Inventors: Andreas Kinnen, Xanten (DE); Helmut Dillenburg, Rheinberg (DE); Kurt Schinninger, Hallein (AT); Christoph Nover, Rheinberg (DE)

(73) Assignee: Solvay Soda Deutschland GmbH, Hannover (DE)

( * ) Notice: Subject to any disclaimer, the term of this patent is extended or adjusted under 35 U.S.C. 154(b) by 0 days.

(21) Appl. No.: 09/476,111

(22) Filed: Jan. 3, 2000

(30) Foreign Application Priority Data

Jan. 2, 1999 (DE) .......................................... 199 00 021

(51) Int. Cl.$^7$ ................................................. C01F 11/18
(52) U.S. Cl. ..................................................... 423/432
(58) Field of Search .................................. 423/155, 157, 423/173, 414, 419.1, 430, 432, 635, 636

(56) References Cited

U.S. PATENT DOCUMENTS

| | | | | |
|---|---|---|---|---|
| 3,920,800 A | | 11/1975 | Harris | |
| 4,159,312 A | * | 6/1979 | Shibazaki | 423/268 |
| 4,714,603 A | * | 12/1987 | Vanderheiden | 423/432 |
| 4,888,160 A | | 12/1989 | Kosin et al. | |
| 5,075,093 A | * | 12/1991 | Tanaka et al. | 423/432 |
| 5,342,600 A | * | 8/1994 | Bleakley et al. | 423/432 |
| 5,833,747 A | * | 11/1998 | Bleakley et al. | 106/464 |
| 5,910,214 A | * | 6/1999 | You | 106/465 |
| 6,156,286 A | * | 12/2000 | Fortier et al. | 423/432 |

* cited by examiner

Primary Examiner—Stanley S. Silverman
Assistant Examiner—Edward M. Johnson
(74) Attorney, Agent, or Firm—Crowell & Moring LLP

(57) ABSTRACT

A process comprising introducing $CO_2$ into milk of lime, in which the milk of lime is first ground, and then the $CO_2$ is introduced to precipitate the calcium carbonate.

1 Claim, No Drawings

PROCESS FOR PREPARING PRECIPITATED CALCIUM CARBONATES

BACKGROUND OF THE INVENTION

The invention relates to a process for the preparation of precipitated calcium carbonate which is suitable as a functional filler and is distinguished by defined properties. One typical field of application is the use of the precipitated calcium carbonate as a filler in plastisols, such as underbody sealants for automobiles.

The precipitated calcium carbonate in this case is capable of controlling the flow behavior of the plastisols. Thus, by using the calcium carbonates which are suitable in each case, plastisols having very differing flow behaviors can be prepared. Depending on the intended application, high, medium or low flow limits may be desired. The flow limit according to Bingham in the plasticiser mixture is usually quoted as a typical characteristic for the application-related suitability of calcium carbonates as fillers. The ability of the precipitated calcium carbonate to control the flow limits is influenced, inter alia, by the nature of the burnt lime used for producing the milk of lime and by the slaking operation.

Finely dispersed calcium carbonate is either prepared from naturally-occurring raw materials by mechanical preparation, or chemically, e.g. by precipitation.

Usually, precipitated calcium carbonate is prepared by introducing $CO_2$ into milk of lime

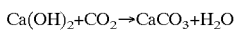
$$Ca(OH)_2 + CO_2 \rightarrow CaCO_3 + H_2O$$

The properties of the precipitated calcium carbonate depend, for example, on the chemical composition of the limestone used or on the burning conditions.

Preferably so-called soft-burned lime is used to prepare precipitated calcium carbonate. To this end, limestone is burned at a temperature of 1000 to 1250° C.

Among other characteristics, the ability of burnt lime to react with water is used to characterize it. The so-called VEC value (Vélocité d'Extinction de Chaux) is measured. In this case, the heating rate of a defined water/burnt lime mixture is measured. Typical VEC values for burnt lime which is suitable for the preparation of precipitated calcium carbonate are above 3° C./min.

To prepare the milk of lime, the burnt lime is reacted with water, for example in a slaking drum, whereupon a $Ca(OH)_2$ suspension, so-called milk of lime, forms. The milk of lime usually has a solids content of 70 to 220 g/liter $Ca(OH)_2$, a viscosity of 30 to 1500 mPas and an average particle diameter of less than 50 $\mu$m.

Milk of lime is used, for example, to neutralize waste water, or to prepare soda or precipitated calcium carbonate.

One drawback of the previously known processes for preparing precipitated calcium carbonate is that it has hitherto not been possible to satisfactorily control the application-related properties of the precipitated calcium carbonate, in particular as a Theological additive, due to its average grain size, grain size distribution and particle form.

U.S. Pat. No. 3,920,800 describes a process for the preparation of precipitated calcium carbonate of high purity. According to the method described, an aqueous calcium hydroxide slurry (milk of lime) is ground in the presence of $CO_2$ at a temperature of at most 1000° C. The calcium carbonate formed by the reaction of the calcium hydroxide with the $CO_2$ is free of calcium hydroxide. The particle size of the calcium carbonate is controlled by means of the temperature during the grinding process. At temperatures of approximately 30° C., very small particles are obtained, and at temperatures of approximately 80° C. larger calcium carbonate particles are obtained.

SUMMARY OF THE INVENTION

It is the object of the invention to provide a process for preparing precipitated calcium carbonate (CCP) having defined, reproducible properties.

This and other objects are achieved in accordance with the invention in that the milk of lime is ground before the $CO_2$ is introduced to precipitate the calcium carbonate.

Known mills may be used for grinding the milk of lime. Preferably bead mills are used. Suitable grinding beads include, in particular, zirconium oxide grinding beads having a diameter of 0.4 to 2 mm.

The grinding result is greatly influenced by the fineness of the beads.

The grinding effect is furthermore controlled by the speed of the mill, the residence time of the milk of lime in the mill and the resulting specific energy input.

The average particle size of the $Ca(OH)_2$ particles in the milk of lime or the viscosity of the milk of lime can also be measured as a measured parameter indicating the success of grinding.

The course of the wet grinding can also be followed by measuring the grain distribution of the calcium hydroxide or by measuring the viscosity of the milk of lime at a defined concentration and temperature.

According to the invention, the viscosity of the milk of lime is measured and used to control the mill. The viscosity should be measured without difficulty, e.g. continuously, and the mill throughput or the speed of the mill, and hence the resulting quality of the milk of lime, can be controlled automatically by means of a corresponding control circuit.

In one embodiment of the invention, the milk of lime is ground to a viscosity of at most 2500 mpas. A higher viscosity should be avoided, since otherwise the introduction of the precipitating gas is not optimally possible.

Therefore, for the purposes of the invention, the viscosity of the ground milk of lime should be set such that the milk of lime can flow readily, so that the precipitating gas can be dispersed homogeneously. The grinding furthermore makes it possible to adjust the viscosity of the milk of lime such that calcium carbonate with application-related properties which are desired in each case, in particular as a rheological additive, can be prepared. Thus, depending on the intended purpose, $CaCO_3$ can be prepared in a consistent quality which is suitable as a high functionality constituent of mixtures for e.g. polymers, polymer preparations, plastics, coating compounds, sealing compounds, paper or paints, in particular printing inks.

After grinding, the milk of lime is supplied to a container into which $CO_2$ is introduced to precipitate the calcium carbonate and is homogeneously dispersed in the milk of lime.

Surprisingly, it has been discovered that the properties of the precipitated calcium carbonate can be reproduced if the milk of lime is first ground, and then $CO_2$ is introduced to precipitate the calcium carbonate.

If precipitated calcium carbonate from non-ground milk of lime is compared with that from ground milk of lime, it is apparent that the grinding has an influence on the reaction rate, on the average particle diameter of the CCP and on the use-related properties of the CCP.

It has been discovered that a decreasing particle size in the milk of lime also involves a reduction in the average particle diameter of the CCP.

It has furthermore been discovered that the precipitation time is decreased by about 20% by using the milk of lime ground according to the invention.

The viscosity-controlled wet grinding of the milk of lime according to the invention makes it possible to significantly influence the flow limit of the CCP-filled plastisols, i.e. to adjust them specifically. It has been found that the flow limit is a function of the specific energy introduced during grinding, or of the viscosity of the milk of lime after grinding. It was therefore discovered that the properties of the CCP can be reproducibly influenced by specifically adjusting the viscosity of the milk of lime.

The undesirable influencing of the properties of the CCP by undefined fluctuations in the nature of the burnt lime and of the slaking operation are cancelled out by the grinding of the milk of lime according to the invention.

DETAILED DESCRIPTION OF PREFERRED EMBODIMENTS

The following examples are intended to illustrate the invention in further detail without restricting its scope.

EXAMPLES 1–6

| | |
|---|---|
| Burnt lime was slaked in a slaking drum: | |
| Lump size | 2–5 cm |
| VEC: | 4.8° C./min |
| The resulting milk of lime was ground and characterized: | |
| solids content | 150 g/liter |
| average particle diameter $D_{50}$: | 4.4 µm |

Grinding Conditions:
  horizontal attrition mill
    grinding chamber volume 5 liters
    22 kW motor power
  grinding bodies:
    spheres of zirconium silicate
    diameter 1.0–1.6 mm
    filled volume: 4.8 liters The tests were performed at a constant speed of 1990 rpm. The residence time of the milk of lime in the mill was varied. Different specific energy inputs resulted from this.

Calcium carbonate was produced from the resulting ground milk of lime by introducing $CO_2$-containing gas:

| Precipitation Conditions: | |
|---|---|
| Precipitation temperature: | 18° C. |
| $CO_2$ concentration in the precipitating gas: | 30% by volume |
| Gas stream: | 1 m³/hour per 10 liters milk of lime |
| Duration of precipitation: | see table |
| Subsequent treatment: | 2% fatty acid |

| Example | Grinding Specific energy (hWh/t) relative to dry product | Milk of lime Viscosity (mPas) | Milk of lime D50 (µm) | CCP precipitation Duration of precipitation (min) | CCP particle diameter dp (nm) |
|---|---|---|---|---|---|
| 1 | 0 | 45 | 4.4 | 98 | 70 |
| 2 | 23 | 50 | 4.4 | 94 | 71 |
| 3 | 31 | 105 | 3.2 | 92 | 66 |
| 4 | 113 | 135 | 2.8 | 83 | 62 |
| 5 | 254 | 860 | 2.1 | 79 | 63 |
| 6 | 307 | 1120 | 1.8 | 77 | 61 |

It is apparent that the viscosity of the milk of lime and the average particle diameter of the milk of lime can be controlled specifically by the wet grinding. This means that the duration of precipitation of CCP can be reduced to 20%. The particle diameters of CCP are reproducibly adjusted.

EXAMPLES 7–12

| Preparation of an underbody sealant: | |
|---|---|
| Plasticiser, dioctyl phthalate | 55 g |
| Plasticiser, diisononyl phthalate | 60 g |
| paste-making PVC, Solvic 374 MIB | 70 g |
| paste-making PVC, Solvic 266 SF | 30 g |
| $CaCO_3$, in accordance with Examples 1–6, respectively, coated with fatty acid | 70.0 g |
| UV-stabilizer, IRGASTAB 17 MOK | 2.0 g |
| Adhesion promoter, Euretek 505 | 4.0 g |
| Drying agent, calcium oxide | 5.0 g |

| Example | Flow limit (Pa) |
|---|---|
| 7 | 40 |
| 8 | 48 |
| 9 | 80 |
| 10 | 89 |
| 11 | 157 |
| 12 | 200 |

CCP from Examples 1–6, respectively, was used in each case to produce underbody sealants corresponding to the formulation described. It becomes clear that the flow limit of the CCP-filled plastisol can also be specifically controlled by wet grinding the milk of lime.

EXAMPLE 13

| Preparation of an offset-printing ink | |
|---|---|
| Pigment, flushed, Eurolith Blue | 25.0% by weight |
| $CaCO_3$, in accordance with Example 4, coated with fatty acid | 15.0% by weight |
| Printing oil, Haltermann, PKWF 4/7 | 12.0% by weight |
| Binder, Uroset | 48.0% by weight |
| Result | |
| Flow limit | 31 Pa |
| Viscosity at shear rate 3/sec | 9.4 Pas |
| Depth of color C | 53 |
| Gloss 60° | 71% |

EXAMPLE 14

| Preparation of polyurethane compounds, 2-component system | |
|---|---|
| Polyol, Desmophen 1150 | 150 g |
| $CaCO_3$ in accordance with Example 6, coated with fatty acid | 60 g |
| Titanium dioxide pigment (rutile), Tiona Rcl-535 | 3 g |
| Dry paste, Baylith L Paste | 15 g |
| Adhesion promoter, Acronal 700L | 1 g |

-continued

| | |
|---|---|
| Plasticiser, Mesamoll II | 35 g |
| Polyurethane activator | 1 g |
| Isocyanate | 3 g |
| Result | |
| Flow limit according to Bingham | 220 Pa |
| Viscosity at shear rate (100/sec) | 6.1 Pas |
| Pot life | 26 min |
| Adhesion | good |
| Dispersion quality/grindometer | <35 μm |

EXAMPLE 15

Preparation of silicone compounds

For testing, a non-curing silicone compound was produced which corresponds to a 2-component system, but the catalyst required for curing was not added.

| | |
|---|---|
| Silicone polymer | 60 g |
| CaCO$_3$ according to Example 2, coated with fatty acid | 38 g |
| Plasticizer | 2 g |
| Result | |
| Flow limit according to Casson | 900 Pa |
| Viscosity at shear rate 5/sec | 280 Pas |
| Dispersion quality/grindometer | <35 μm |

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A process for the preparation of precipitated calcium carbonate with reproducible application-related properties, said process comprising the steps of:

subjecting milk of lime to specific grinding treatment to obtain ground milk of lime, continuously measuring the viscosity of the milk of lime during the specific grinding treatment so that the viscosity of the milk of lime is at most 2500 mPas, controlling the grinding in response to the measured viscosity, and thereafter introducing $CO_2$ into the ground milk of lime to precipitate calcium carbonate having a particle size of less than about 70 nm, wherein the temperature of the precipitation is 18° C., the $CO_2$ concentration is 30 vol. %, and the time of precipitation is between 77–94 minutes.

* * * * *